United States Patent
Akiyama

(10) Patent No.: US 9,632,321 B2
(45) Date of Patent: Apr. 25, 2017

(54) ILLUMINATION DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 8 days.

(21) Appl. No.: 14/791,830

(22) Filed: Jul. 6, 2015

(65) Prior Publication Data

US 2016/0011497 A1  Jan. 14, 2016

(30) Foreign Application Priority Data

Jul. 9, 2014  (JP) .................................. 2014-141479

(51) Int. Cl.
*G02B 27/14* (2006.01)
*G03B 21/20* (2006.01)

(52) U.S. Cl.
CPC ......... *G02B 27/141* (2013.01); *G03B 21/204* (2013.01); *G03B 21/208* (2013.01)

(58) Field of Classification Search
CPC  G03B 21/204; G03B 21/208; G03B 21/2033; G03B 21/2066; H04N 9/315; H04N 9/3152; H04N 9/3161; H04N 9/3167
See application file for complete search history.

(56) References Cited

U.S. PATENT DOCUMENTS

| 7,542,209 | B2 * | 6/2009 | McGuire, Jr. ...... G02B 27/0081 359/630 |
| 2002/0176255 | A1 * | 11/2002 | Yamauchi .......... G02B 27/0927 362/299 |
| 2005/0094287 | A1 * | 5/2005 | Yeo ........................ G02B 15/16 359/691 |
| 2007/0103644 | A1 * | 5/2007 | Nakamura ............. G02B 13/22 353/31 |
| 2012/0127435 | A1 | 5/2012 | Kitano et al. |

(Continued)

FOREIGN PATENT DOCUMENTS

| JP | 2001-356404 A | 12/2001 |
| JP | 2012-108486 A | 6/2012 |

(Continued)

*Primary Examiner* — Sultan Chowdhury
(74) *Attorney, Agent, or Firm* — Oliff PLC

(57) ABSTRACT

An illumination device includes: a light source that emits first light at a first wavelength; an integrator optical system that the first light enters; a wavelength conversion element that converts the first light transmitting through the integrator optical system into second light at a second wavelength different from the first wavelength; a wavelength separation element provided on an optical path of the first light between the integrator optical system and the wavelength conversion element; a pickup optical system that is provided between the wavelength conversion element and the wavelength separation element and receives the first light and the second light; and a chromatic aberration-correcting optical element provided at least one of between the integrator optical system and the wavelength separation element on the optical path of the first light and at downstream of the wavelength separation element on an optical path of the second light.

6 Claims, 5 Drawing Sheets

(56) References Cited

U.S. PATENT DOCUMENTS

2012/0133904 A1    5/2012  Akiyama
2013/0222772 A1*   8/2013  Matsubara ........... G03B 21/204
                                                        353/31
2016/0153904 A1*   6/2016  Mukoh .............. G01N 21/4795
                                                        356/479

FOREIGN PATENT DOCUMENTS

JP    2012-118110 A    6/2012
JP    2013-114980 A    6/2013

* cited by examiner

ILLUMINATION DEVICE AND PROJECTOR

BACKGROUND

1. Technical Field

The present invention relates to an illumination device and a projector.

2. Related Art

In recent years, a light source device utilizing a phosphor is used in a projector (for example, refer to JP-A-2012-108486). In the light source device, excitation light is condensed by a condensing lens onto a phosphor layer, and fluorescence from the phosphor layer is collimated by the condensing lens. In the light source device as described above, the condensing lens not only condenses the excitation light but also collimates the fluorescence. That is, the condensing lens acts not only as a condensing optical system but also as a collimating optical system.

In order to utilize the fluorescence with high efficiency in the projector, the parallelism of the fluorescence emitted from the light source device is required to be high. Moreover, in order to increase the uniformity of an intensity distribution of the fluorescence, the uniformity of an illuminance distribution of the excitation light on the phosphor layer is required to be high. In the related art, however, when the condensing lens is designed so as to uniform the illuminance distribution of the excitation light on the phosphor layer, the parallelism of the fluorescence is reduced due to the influence of chromatic aberration. Conversely, when the condensing lens is designed so as to increase the parallelism of the fluorescence, the uniformity of the illuminance distribution of the excitation light on the phosphor layer is reduced due to the influence of chromatic aberration. In the related art as described above, it is difficult to achieve both the use efficiency of the fluorescence and the uniformity of the intensity distribution of the fluorescence using the optical system that acts not only as a condensing optical system but also as a collimating optical system.

SUMMARY

An advantage of some aspects of the invention is to provide an illumination device and a projector both of which can efficiently utilize fluorescence having a highly uniform intensity distribution.

A first aspect of the invention provides an illumination device including: a light source that emits first light at a first wavelength; an integrator optical system on which the first light emitted from the light source is incident; a wavelength conversion element that converts the first light transmitting through the integrator optical system into second light at a second wavelength different from the first wavelength; a wavelength separation element that is provided on an optical path of the first light between the integrator optical system and the wavelength conversion element; a pickup optical system that is provided between the wavelength conversion element and the wavelength separation element and on which the first light and the second light are incident; and a chromatic aberration-correcting optical element that is provided at least one of between the integrator optical system and the wavelength separation element on the optical path of the first light and at downstream of the wavelength separation element on an optical path of the second light.

When the pickup optical system designed corresponding to the first wavelength is used, the parallelism of the second light passing through the pickup optical system is reduced because of chromatic aberration. However, in the illumination device according to the first aspect, the parallelism of the second light can be improved by the chromatic aberration-correcting optical element provided at the downstream of the wavelength separation element on the optical path of the second light. When the pickup optical system designed corresponding to the second wavelength is used, the uniformity of an illuminance distribution on the wavelength conversion element is reduced because of chromatic aberration. However, the uniformity of the illuminance distribution can be improved by the chromatic aberration-correcting optical element provided between the integrator optical system and the wavelength separation element on the optical path of the first light. In this manner, it is possible to simultaneously obtain the high uniformity of the illuminance distribution on the wavelength conversion element and the high parallelism of the second light passing through the pickup optical system. Therefore, the second light having a highly uniform intensity distribution can be efficiently utilized.

In the first aspect, the chromatic aberration-correcting optical element may be configured such that the chromatic aberration-correcting optical element has negative power and is provided between the integrator optical system and the wavelength separation element on the optical path of the first light.

When the pickup optical system designed corresponding to the second wavelength is used, the uniformity of the illuminance distribution on the wavelength conversion element is reduced because of chromatic aberration. However, according to this configuration, the uniformity of the illuminance distribution can be improved.

In the first aspect, the chromatic aberration-correcting optical element may be configured such that the chromatic aberration-correcting optical element has positive power and is provided at downstream of the wavelength separation element on the optical path of the second light.

When the pickup optical system designed corresponding to the first wavelength is used, the parallelism of the second light having passed through the pickup optical system is reduced because of chromatic aberration. However, according to this configuration, the parallelism of the second light can be improved.

A second aspect of the invention provides a projector including: an illumination device that emits illumination light; a light modulator that modulates the illumination light in response to image information to thereby form image light; and a projection optical system that projects the image light, wherein the illumination device is the illumination device according to the first aspect.

According to the projector according to the second aspect, since the illumination device according to the first aspect is included, the projector can display an image of excellent quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
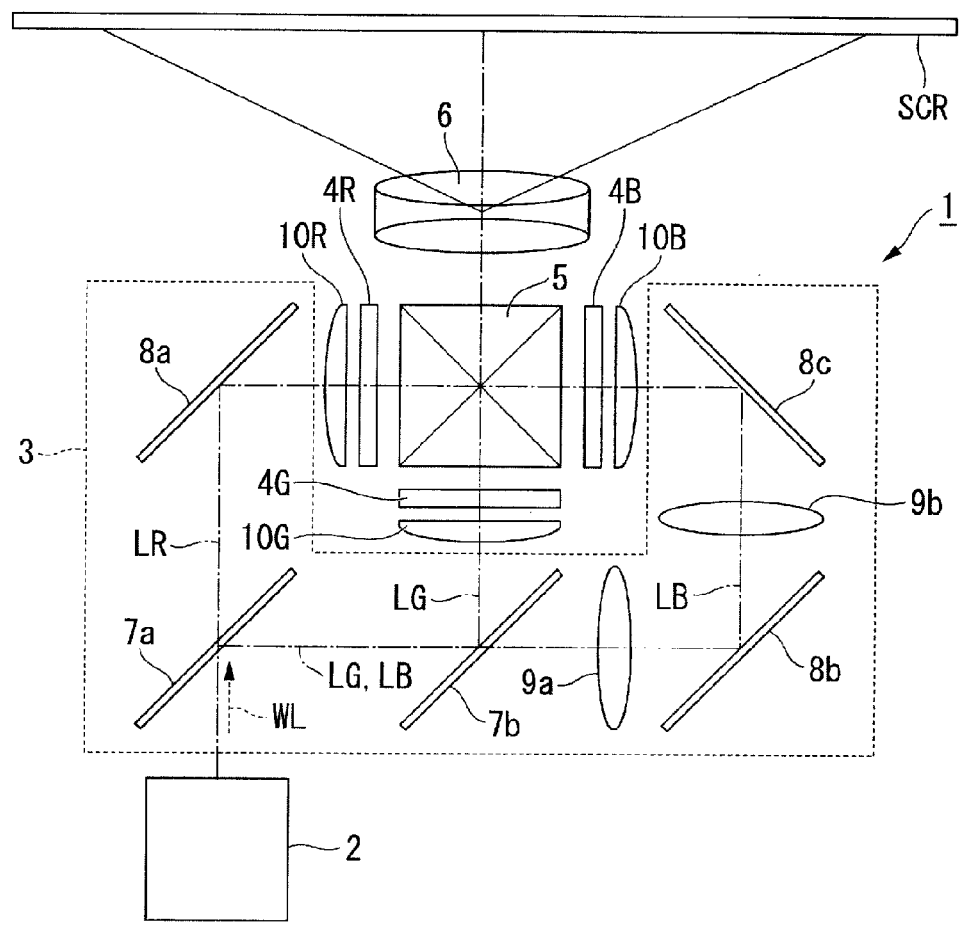
FIG. 1 is a plan view showing a schematic configuration of a projector according to a first embodiment.

Hereinafter, embodiments of the invention will be described in detail with reference to the drawings.

In the drawings used in the following description, a characteristic portion is shown in an enlarged manner in some cases for convenience for clarity of the characteristic, and thus the dimension ratio and the like of each component are not always the same as actual ones.

First Embodiment

First, an example of a projector according to a first embodiment will be described. The projector of the embodiment is a projection type image display device that displays a color video (image) on a screen (projected surface) SCR. The projector 1 uses three light modulators corresponding to respective color lights of red light, green light, and blue light. The projector uses, as light sources of an illumination device, semiconductor lasers (laser light sources) with which high-luminance, high-output light is obtainable.

Projector

FIG. 1 is a plan view showing a schematic configuration of the projector according to the embodiment. As shown in FIG. 1, the projector 1 includes an illumination device 2, a color separation optical system 3, a light modulator 4R, a light modulator 4G, a light modulator 4B, a combining optical system 5, and a projection optical system 6.

The color separation optical system 3 separates illumination light WL into red light LR, green light LG, and blue light LB. The color separation optical system 3 schematically includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a has a function of separating the illumination light WL from the illumination device 2 into the red light LR and the other light (the green light LG and the blue light LB). The first dichroic mirror 7a transmits the separated red light LR therethrough while reflecting the other light (the green light LG and the blue light LB). On the other hand, the second dichroic mirror 7b has a function of separating the other light into the green light LG and the blue light LB. The second dichroic mirror 7b reflects the separated green light LG while transmitting the blue light LB therethrough.

The first total reflection mirror 8a is disposed in the optical path of the red light LR and reflects the red light LR transmitting through the first dichroic mirror 7a toward the light modulator 4R. On the other hand, the second total reflection mirror 8b and the third total reflection mirror 8c are disposed in the optical path of the blue light LB and direct the blue light LB transmitting through the second dichroic mirror 7b to the light modulator 4B. The green light LG is reflected from the second dichroic mirror 7b toward the light modulator 4G.

The first relay lens 9a and the second relay lens 9b are disposed on the light exiting side of the second total reflection mirror 8b in the optical path of the blue light LB. The first relay lens 9a and the second relay lens 9b have a function of compensating for light loss of the blue light LB due to the fact that the optical path length of the blue light LB is longer than the optical path length of the red light LR or the green light LG.

The light modulator 4R modulates the red light LR in response to image information and forms image light corresponding to the red light LR. The light modulator 4G modulates the green light LG in response to image information and forms image light corresponding to the green light LG. The light modulator 4B modulates the blue light LB in response to image information and forms image light corresponding to the blue light LB.

For each of the light modulator 4R, the light modulator 4G, and the light modulator 4B, for example, a transmissive liquid crystal panel is used. Moreover, a pair of polarizers (not shown) are disposed on the incident and exiting sides of the liquid crystal panel, and configured to allow only a linearly polarized light in a specific direction to transmit therethrough.

A field lens 10R, a field lens 10G, and a field lens 10B are disposed on the incident sides of the light modulator 4R, the light modulator 4G, and the light modulator 4B, respectively. The field lens 10R, the field lens 10G, and the field lens 10B collimate the red light LR, the green light LG, and the blue light LB to be incident on the light modulator 4R, the light modulator 4G, and the light modulator 4B, respectively.

The image lights from the light modulator 4R, the light modulator 4G, and the light modulator 4B are incident on the combining optical system 5. The combining optical system 5 combines the image lights corresponding to the red light LR, the green light LG, and the blue light LB, and emits the combined image light toward the projection optical system 6. For the combining optical system 5, for example, a cross dichroic prism is used.

The projection optical system 6 is formed of a projection lens group, and enlarges and projects the image light combined by the combining optical system 5 onto the screen SCR. Due to this, an enlarged color video is displayed on the screen SCR.

Illumination Device

Figure 2:
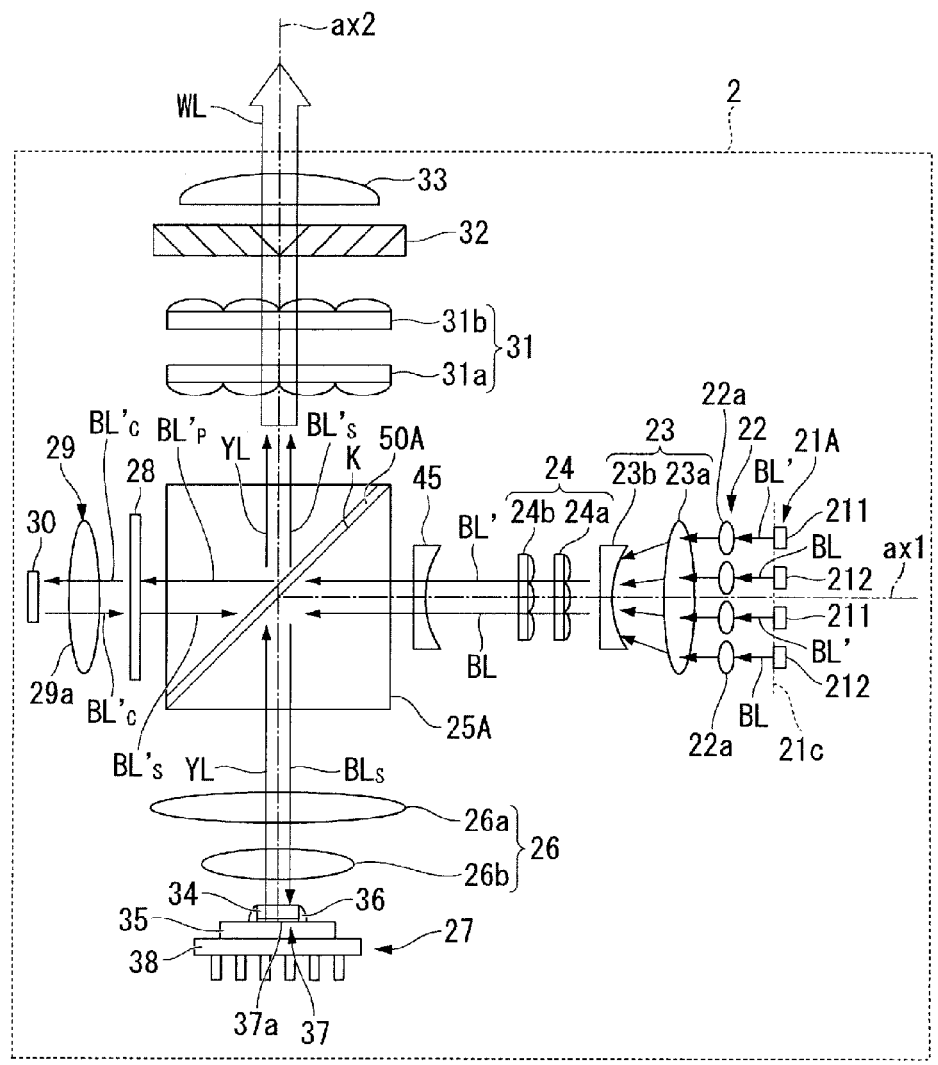
FIG. 2 is a plan view showing a schematic configuration of an illumination device of the first embodiment.

Subsequently, the illumination device 2 according to the embodiment of the invention will be described. FIG. 2 is a diagram showing a schematic configuration of the illumination device 2. As shown in FIG. 2, the illumination device 2 includes an array light source 21A, a collimator optical system 22, an afocal optical system 23, a homogenizer optical system (integrator optical system) 24, an optical element 25A including a polarization separation element 50A, a first pickup optical system 26, a fluorescent light-emitting element 27, a retardation film 28, a second pickup optical system 29, a diffuse reflection element 30, an integrator optical system 31, a polarization conversion element 32, a superimposing optical system 33, and a chromatic aberration-correcting optical element 45.

The array light source 21A, the collimator optical system 22, the afocal optical system 23, the homogenizer optical system (integrator optical system) 24, the optical element 25A, the retardation film 28, the second pickup optical system 29, and the diffuse reflection element 30 are successively aligned on an optical axis ax1 shown in FIG. 2 in a state where the respective optical centers are coincident with the optical axis ax1. On the other hand, the fluorescent light-emitting element 27, the first pickup optical system 26, the optical element 25A, the integrator optical system 31, the polarization conversion element 32, and the superimposing optical system 33 are successively aligned on an optical axis ax2 shown in FIG. 2 in a state where the respective optical centers are coincident with the optical axis ax2. The optical axis ax1 and the optical axis ax2 exist in the same plane and are orthogonal to each other.

The array light source 21A includes first semiconductor lasers (light sources) 211 and second semiconductor lasers 212. The plurality of first semiconductor lasers 211 and the plurality of second semiconductor lasers 212 are aligned in an array in a plane orthogonal to the optical axis ax1.

The first semiconductor laser 211 emits blue light BL'. The first semiconductor laser 211 emits laser light at, for example, a peak wavelength of 460 nm as the blue light BL'. The second semiconductor laser 212 is a laser light source for excitation light, which emits excitation light BL as first light. The second semiconductor laser 212 emits laser light at, for example, a peak wavelength of 440 nm (first wavelength) as the excitation light BL.

The excitation light BL and the blue light BL' are emitted from the array light source 21A toward the polarization separation element 50A.

The excitation light BL and the blue light BL' emitted from the array light source 21A are incident on the collimator optical system 22. The collimator optical system 22 converts the excitation light BL and the blue light BL' emitted from the array light source 21A into parallel light beams. The collimator optical system 22 is composed of, for example, a plurality of collimator lenses 22a aligned in an array. The plurality of collimator lenses 22a are disposed corresponding to the plurality of first semiconductor lasers 211 and the plurality of second semiconductor lasers 212.

The excitation light BL and the blue light BL' passing through the collimator optical system 22 and thus converted into the parallel light beams are incident on the afocal optical system 23. The afocal optical system 23 adjusts the light beam diameters of the excitation light BL and the blue light BL'. The afocal optical system 23 is composed of, for example, a convex lens 23a and a concave lens 23b.

The excitation light BL and the blue light BL' passing through the afocal optical system. 23 and thus adjusted in light beam diameter are incident on the homogenizer optical system 24. The homogenizer optical system 24 is composed of, for example, a multi-lens array 24a and a multi-lens array 24b.

The excitation light BL and the blue light BL' transmitting through the homogenizer optical system 24 are incident on the optical element 25A. The optical element 25A is composed of, for example, a dichroic prism having wavelength selectivity. The dichroic prism has an inclined surface K forming an angle of 45° with the optical axis ax1. The inclined surface K also forms an angle of 45° with the optical axis ax2. The optical element 25A is disposed such that the intersection point between the optical axes ax1 and ax2 orthogonal to each other coincides with the optical center of the inclined surface K.

The inclined surface K is provided with the polarization separation element 50A having wavelength selectivity. The polarization separation element 50A separates the excitation light BL and the blue light BL' into an S-polarized component and a P-polarized component with respect to the polarization separation element 50A.

Moreover, the polarization separation element 50A has a color separation function that transmits therethrough fluorescent light YL, described later, as second light of a different wavelength band from the excitation light BL and the blue light BL' irrespective of the polarization state of the fluorescent light YL. That is, the polarization separation element 50A has a function as a wavelength separation element in the appended claims.

Here, the excitation light BL and the blue light BL' are each coherent linearly polarized light. Moreover, the excitation light BL and the blue light BL' have different polarization directions from each other when being incident on the polarization separation element 50A.

Specifically, the polarization direction of the excitation light BL is coincident with the polarization direction of the S-polarized component to be reflected by the polarization separation element 50A. On the other hand, the polarization direction of the blue light BL' is coincident with the polarization direction of the P-polarized component to be transmitted by the polarization separation element 50A.

Hence, the excitation light BL incident on the polarization separation element 50A is reflected as S-polarized excitation light $BL_S$ toward the fluorescent light-emitting element 27. On the other hand, the blue light BL' incident on the polarization separation element 50A is transmitted as P-polarized blue light $BL'_P$ toward the diffuse reflection element 30.

The S-polarized excitation light $BL_S$ emitted from the polarization separation element 50A is incident on the first pickup optical system 26. The first pickup optical system 26 condenses a plurality of light beams (the excitation lights $BL_S$) emitted from the multi-lens array 24b onto a phosphor layer 34, and superimposes the plurality of light beams on each other on the phosphor layer 34.

The first pickup optical system 26 is composed of, for example, a pickup lens 26a and a pickup lens 26b.

The excitation light $BL_S$ emitted from the first pickup optical system 26 is incident on the fluorescent light-emitting element 27. The fluorescent light-emitting element 27 includes the phosphor layer 34, a substrate 35 that supports the phosphor layer 34, and a fixing member 36 that fixes the phosphor layer 34 to the substrate 35.

The phosphor layer 34 is fixed to the substrate 35 by means of the fixing member 36 provided between a side surface of the phosphor layer 34 and the substrate 35. A surface of the phosphor layer 34 on the side opposite to the side on which the excitation light $BL_S$ is incident is in contact with the substrate 35.

The phosphor layer 34 includes a phosphor that is excited by absorbing the excitation light $BL_S$ at a wavelength of 440 nm, and the phosphor excited by the excitation light $BL_S$ generates as the second light the fluorescent light (yellow light) YL having a peak wavelength (second wavelength) in, for example, a wavelength range from 500 to 700 nm.

For the phosphor layer 34, a phosphor layer having excellent heat resistance and surface processability is preferably used. As the phosphor layer 34, for example, a phosphor layer obtained by dispersing phosphor particles in an inorganic binder such as alumina, or a phosphor layer obtained by sintering phosphor particles without using a binder can be preferably used.

A reflection portion 37 as a first reflection element is provided on the phosphor layer 34 on the side opposite to the side on which the excitation light $BL_S$ is incident. The reflection portion 37 has a function of reflecting a portion of the fluorescent light YL generated by the phosphor layer 34.

A heat sink 38 is disposed on a surface of the substrate 35 on the side opposite to a surface thereof supporting the phosphor layer 34. Since heat can be dissipated via the heat sink 38 in the fluorescent light-emitting element 27, thermal degradation of the phosphor layer 34 can be prevented.

A portion of the fluorescent light YL generated by the phosphor layer 34 is reflected by the reflection portion 37 and emitted outside the phosphor layer 34. Moreover, another portion of the fluorescent light YL generated by the phosphor layer 34 is emitted outside the phosphor layer 34 without via the reflection portion 37. In this manner, the fluorescent light YL is emitted from the phosphor layer 34.

The fluorescent light YL emitted from the phosphor layer 34 is unpolarized light whose polarization direction is not aligned. After passing through the first pickup optical system 26, the fluorescent light YL is incident on the polarization separation element 50A. Then, the fluorescent light YL is transmitted from the polarization separation element 50A toward the integrator optical system 31.

The excitation light (first light) $BL_S$ and the fluorescent light (second light) YL are incident on the first pickup optical system 26. The first pickup optical system 26 corresponds to a pickup optical system in the appended claim. The first pickup optical system 26 functions as a condensing lens that condenses the excitation light $BL_S$ onto the phosphor layer 34, and also functions as a collimating lens that collimates the fluorescent light YL and emits the fluorescent light YL toward the integrator optical system 31 (the polarization separation element 50A).

The first pickup optical system 26 has axial chromatic aberration. Since the excitation light $BL_S$ and the fluorescent light YL are different in wavelength from each other, the focal positions of the excitation light $BL_S$ and the fluorescent light YL through the first pickup optical system 26 are different from each other due to axial chromatic aberration.

When the first pickup optical system 26 is designed corresponding to the first wavelength, the phosphor layer 34 is disposed at an optimum position at which the phosphor layer 34 is irradiated with the excitation light $BL_S$ with high uniformity. Therefore, the uniformity of an illuminance distribution of the excitation light $BL_S$ on the phosphor layer 34 is high. However, because of axial chromatic aberration, the phosphor layer 34 is disposed at a position shifted from the focal position of the first pickup optical system 26 with respect to the second wavelength. Therefore, the parallelism of the fluorescent light YL passing through the first pickup optical system 26 is low.

Conversely, when the first pickup optical system 26 is designed corresponding to the second wavelength, the phosphor layer 34 is disposed at the focal position of the first pickup optical system 26 with respect to the second wavelength. Therefore, the parallelism of the fluorescent light YL passing through the first pickup optical system 26 is high. However, because of axial chromatic aberration, the phosphor layer 34 is disposed at a position shifted from the optimum position at which the phosphor layer 34 is irradiated with the excitation light $BL_S$ with high uniformity. Therefore, the uniformity of the illuminance distribution of the excitation light $BL_S$ on the phosphor layer 34 is low.

In order to prevent the occurrence of such a problem, it is considered to provide the first pickup optical system 26 with a chromatic aberration-correcting function. However, since the first pickup optical system 26 (the pickup lens 26a) has a very high numerical aperture NA, a number of lenses are required for correcting chromatic aberration, the size of the optical system is increased, and its cost is increased as well. Therefore, the providing of the chromatic aberration-correcting function lacks in reality.

In the embodiment, the first pickup optical system 26 is designed corresponding to the second wavelength. That is, the focal position is optimally designed so as to obtain high parallelism of the fluorescent light YL.

Figure 3A:
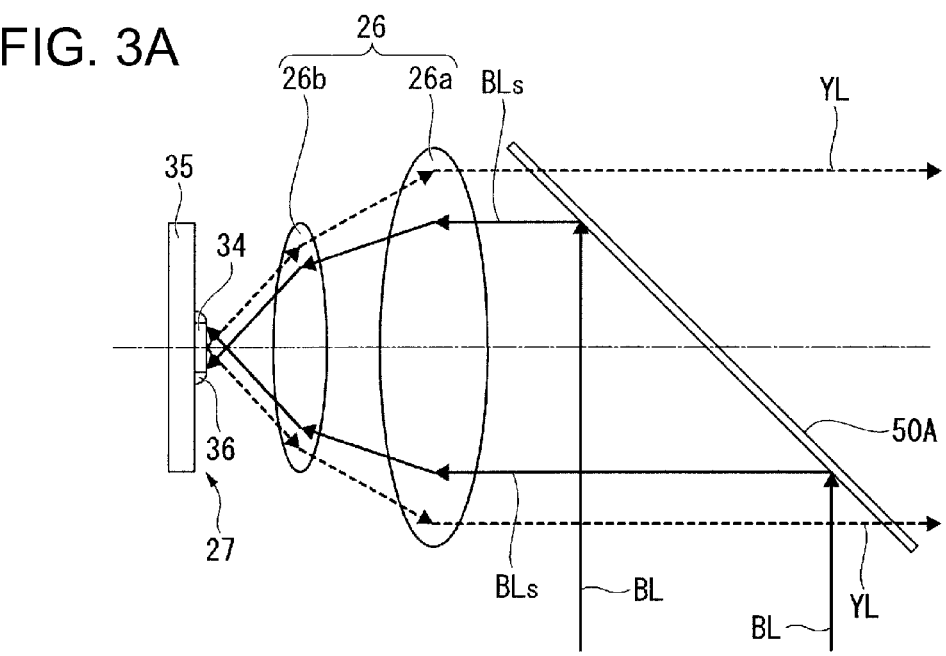
FIGS. 3A and 3B are diagrams showing the effect of a chromatic aberration-correcting optical element of the first embodiment.
Figure 3B:
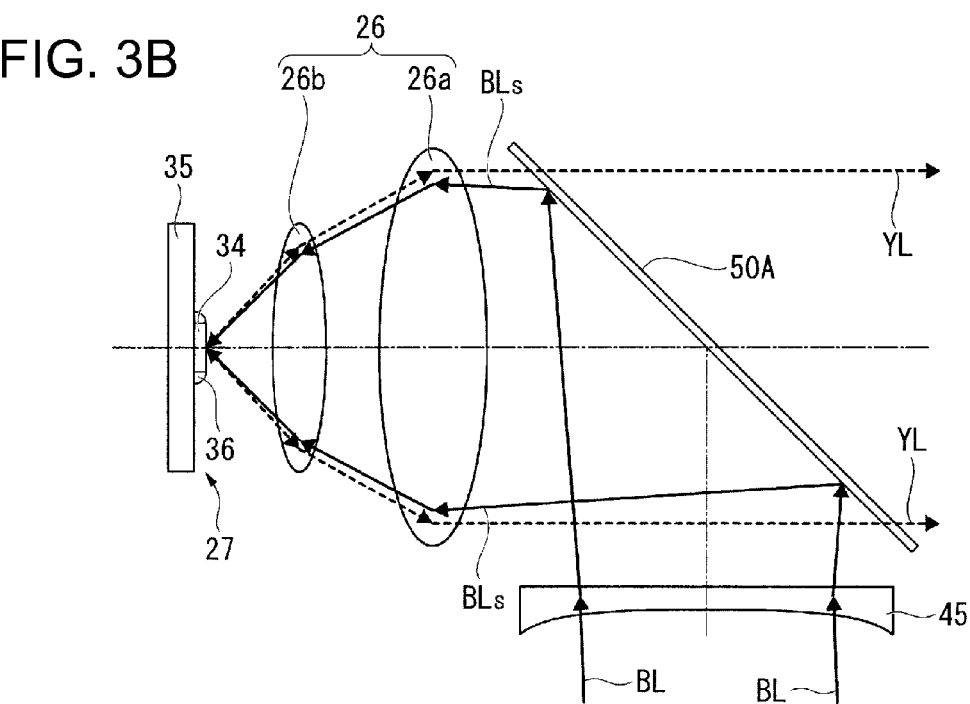

FIGS. 3A and 3B are diagrams showing the effect of the chromatic aberration-correcting optical element 45, in which FIG. 3A shows, by way of comparison, the states of the excitation light $BL_S$ and the fluorescent light YL when the chromatic aberration-correcting optical element 45 is not included and FIG. 3B shows the states of the excitation light $BL_S$ and the fluorescent light YL when the chromatic aberration-correcting optical element 45 is included.

As described above, since the first pickup optical system 26 designed corresponding to the second wavelength favorably collimates the fluorescent light YL as shown in FIG. 3A, the fluorescent light YL can be efficiently utilized by the optical element provided at downstream of the first pickup optical system 26. However, because of axial chromatic aberration, the focal position of the excitation light $BL_S$ is shifted to the front of the phosphor layer 34. Therefore, the excitation light $BL_S$ is incident in a blurred state on the phosphor layer 34. As a result, the uniformity of the illuminance distribution of the excitation light $BL_S$ on the phosphor layer 34 becomes low, so that also the uniformity of the intensity distribution of the fluorescent light YL to be emitted from the phosphor layer 34 becomes low.

In contrast to this, the illumination device 2 includes the chromatic aberration-correcting optical element 45 disposed between the homogenizer optical system 24 and the polarization separation element 50A on the optical path of the excitation light $BL_S$ in the embodiment. The chromatic aberration-correcting optical element 45 has negative power and is composed of, for example, a plano-concave lens. The use of the plano-concave lens described above suppresses an increase in cost.

Since the chromatic aberration-correcting optical element 45 diffuses the excitation light $BL_S$ as shown in FIG. 3B, the excitation light $BL_S$ is condensed onto the surface of the phosphor layer 34. According to this, the illuminance distribution of the excitation light $BL_S$ on the phosphor layer 34 is uniformed, so that the fluorescent light YL having a highly uniform intensity distribution can be efficiently generated.

As has been described above, according to the illumination device 2 of the embodiment, chromatic aberration occurring in the first pickup optical system 26 can be easily corrected by using the chromatic aberration-correcting optical element 45. As a result, the fluorescent light YL having a highly uniform intensity distribution can be efficiently generated, and also the use efficiency of the fluorescent light YL can be increased.

On the other hand, the P-polarized blue light BL'p emitted from the polarization separation element 50A is incident on the retardation film 28. The retardation film 28 is composed of a ¼ wave plate disposed in the optical path between the polarization separation element 50A and the diffuse reflection element 30. Hence, the P-polarized blue light $BL'_P$ emitted from the polarization separation element 50A is converted by the retardation film 28 into circularly polarized blue light $BL'_C$, and then incident on the second pickup optical system 29.

The second pickup optical system 29 condenses the blue light $BL'_C$ onto the diffuse reflection element 30 and is composed of, for example, a pickup lens 29a.

The diffuse reflection element 30 diffusely reflects the blue light $BL'_C$ emitted from the second pickup optical system 29 toward the polarization separation element 50A. As the diffuse reflection element 30, a diffuse reflection element that reflects in a Lambertian manner the blue light $BL'_C$ incident on the diffuse reflection element 30 is preferably used.

The blue light $BL'_C$ diffusely reflected by the diffuse reflection element 30 is incident again on the retardation film 28 to thereby be converted into S-polarized blue light $BL'_S$, and then incident on the polarization separation element 50A. Then, the S-polarized blue light BL′$_S$ is reflected from the polarization separation element 50A toward the integrator optical system 31.

Due to this, the blue light BL′$_S$ is utilized as the illumination light WL together with the fluorescent light YL transmitting through the polarization separation element 50A. That is, the blue light BL′$_S$ and the fluorescent light YL are emitted from the polarization separation element 50A toward the same direction. Due to this, the illumination light (white light) WL, which is a mixture of the blue light BL′$_S$ and the fluorescent light (yellow light) YL, is obtained.

The illumination light WL emitted from the polarization separation element 50A is incident on the integrator optical system 31. The integrator optical system 31 is composed of, for example, a lens array 31a and a lens array 31b. Each of the lens arrays 31a and 31b is formed of a plurality of lenses arranged in an array.

The illumination light WL passing through the integrator optical system 31 is incident on the polarization conversion element 32. The polarization conversion element 32 is composed of a polarization separation film and a retardation film. The polarization conversion element 32 coverts the fluorescent light YL, which is unpolarized light, into S-polarized light.

The illumination light WL converted by the polarization conversion element 32 into S-polarized light is incident on the superimposing optical system 33. The superimposing optical system 33 superimposes the illumination light WL emitted from the polarization conversion element 32 in an illuminated area. The superimposing optical system 33 is composed of, for example, a superimposing lens 33a. Due to this, the illuminance distribution of the illuminated area is uniformed.

In the illumination device 2, the illumination light WL can be efficiently obtained by using the fluorescent light YL and the blue light BL′$_S$.

Moreover, since the illumination device 2 has an easy structure in which the chromatic aberration-correcting optical element 45 formed of one plano-concave lens is provided between the homogenizer optical system 24 and the polarization separation element 50A on the optical path of the excitation light BL$_S$, the device configuration can be downsized. Moreover, since the number of lenses is small compared to the case where the first pickup optical system 26 is provided with a chromatic aberration-correcting function, the illumination device 2 is very advantageous also in terms of cost.

According to the projector 1 of the embodiment as described above, since the illumination device 2 is included, the projector 1 can display an image of excellent quality.

Second Embodiment

Figure 4:
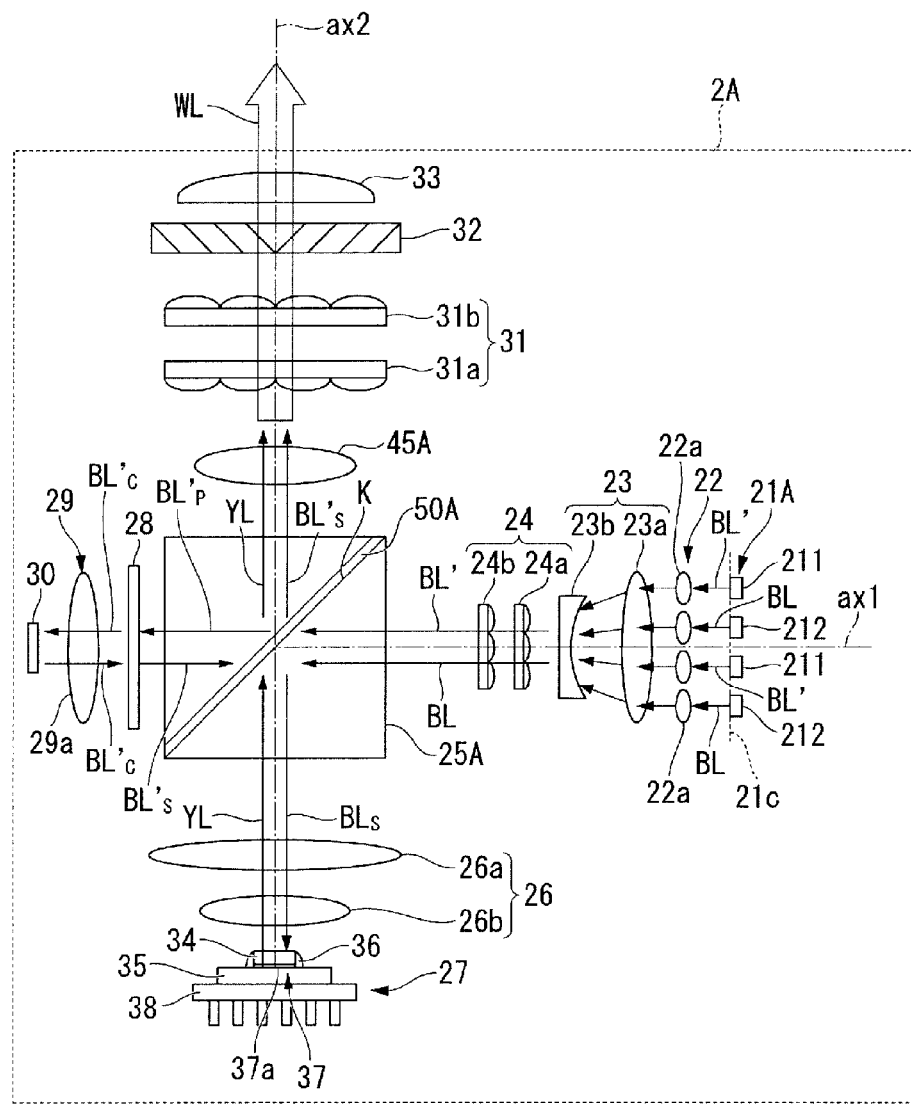
FIG. 4 is a plan view showing a schematic configuration of an illumination device of a second embodiment.

Next, an illumination device 2A shown in FIG. 4 will be described as a second embodiment. FIG. 4 is a plan view showing a schematic configuration of the illumination device 2A.

The second embodiment differs from the first embodiment in the position at which a chromatic aberration-correcting optical element is disposed, and configurations other than the position are common with those of the first embodiment. Therefore, in the following description, a description of portions equivalent to those of the illumination device 2 shown in FIG. 2 is omitted, and the portions are denoted by the same reference numerals and signs in the drawing.

As shown in FIG. 4, the illumination device 2A of the embodiment includes the array light source 21A, the collimator optical system 22, the afocal optical system 23, the homogenizer optical system 24, the optical element 25A including the polarization separation element 50A, the first pickup optical system 26, the fluorescent light-emitting element 27, the retardation film 28, the second pickup optical system 29, the diffuse reflection element 30, the integrator optical system 31, the polarization conversion element 32, the superimposing optical system 33, and a chromatic aberration-correcting optical element 45A.

In the embodiment, the first pickup optical system 26 is designed corresponding to the first wavelength. That is, the focal position is optimally designed so as to obtain high uniformity of the illuminance distribution of the excitation light BL$_S$ on the phosphor layer 34.

Figure 5A:
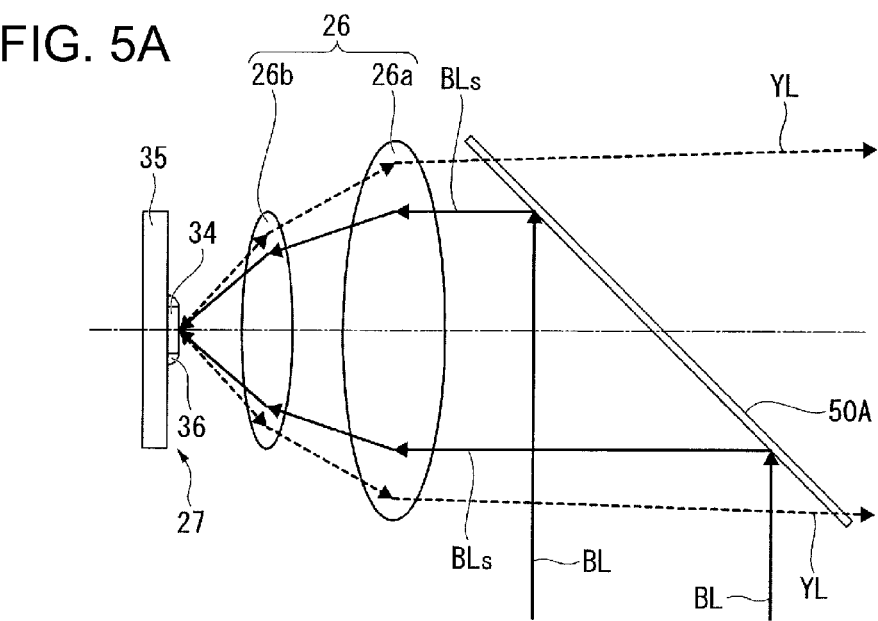
FIGS. 5A and 5B are diagrams showing the effect of a chromatic aberration-correcting optical element of the second embodiment.
Figure 5B:
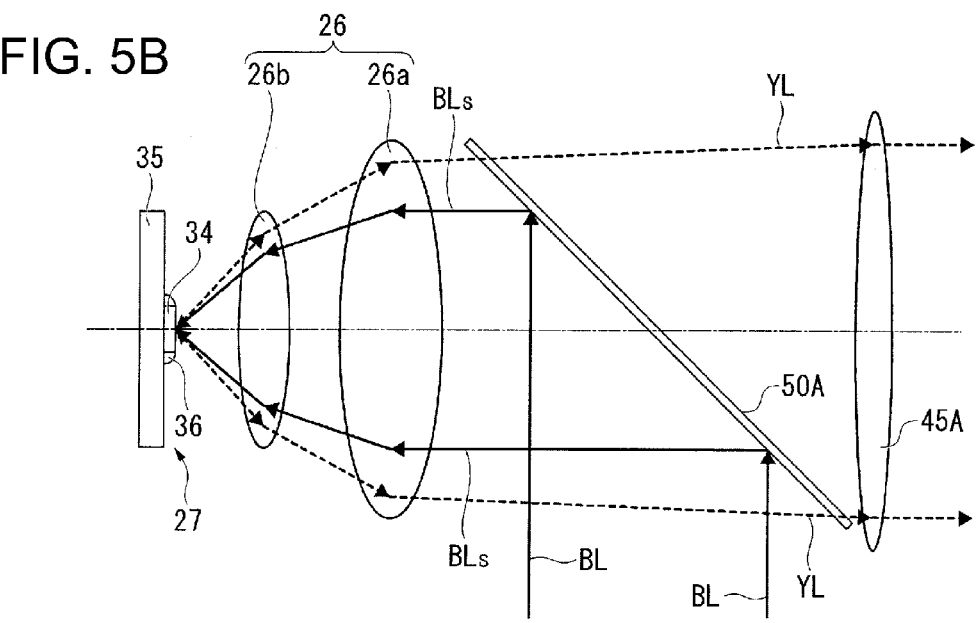

FIGS. 5A and 5B are diagrams showing the effect of the chromatic aberration-correcting optical element 45A, in which FIG. 5A shows, by way of comparison, the states of the excitation light BL$_S$ and the fluorescent light YL when the chromatic aberration-correcting optical element 45A is not included and FIG. 5B shows the states of the excitation light BL$_S$ and the fluorescent light YL when the chromatic aberration-correcting optical element 45A is included.

The first pickup optical system 26 designed corresponding to the first wavelength condenses the excitation light BL$_S$ onto the surface of the phosphor layer 34 as shown in FIG. 5A. Due to this, the uniformity of the illuminance distribution of the excitation light BL$_S$ on the phosphor layer becomes high. However, because of axial chromatic aberration, the phosphor layer 34 is disposed at a position shifted from the focal position of the first pickup optical system 26 with respect to the second wavelength. Therefore, the parallelism of the fluorescent light YL passing through the first pickup optical system 26 is low. Since the fluorescent light YL is diffused, a secondary light source image formed in the vicinity of the lens array 31b is blurred and thus cannot efficiently pass through the polarization conversion element 32. Therefore, the use efficiency of the fluorescent light YL is reduced.

In contrast to this, the illumination device 2A includes the chromatic aberration-correcting optical element 45A disposed at downstream of the polarization separation element 50A (between the polarization separation element 50A and the lens array 31a) on the optical path of the fluorescent light YL in the embodiment. The chromatic aberration-correcting optical element 45A has positive power and is composed of, for example, a plano-convex lens. The use of the plano-convex lens described above suppresses an increase in cost.

The chromatic aberration-correcting optical element 45A converts the diffused fluorescent light YL into parallel light as shown in FIG. 5B. According to this, since the fluorescent light YL converted into the parallel light is favorably incident on the integrator optical system 31, the use efficiency of the fluorescent light YL can be increased.

As has been described above, according to the illumination device 2A of the embodiment, chromatic aberration occurring in the first pickup optical system 26 can be easily corrected by using the chromatic aberration-correcting optical element 45A. As a result, the fluorescent light YL having a highly uniform intensity distribution can be efficiently generated, and also, the use efficiency of the fluorescent light YL can be increased.

Moreover, since the illumination device 2A has an easy structure in which the chromatic aberration-correcting optical element 45A formed of one plano-convex lens is provided at downstream of the polarization separation element 50A, the device configuration can be downsized. Moreover, since the number of lenses is small compared to the case where the first pickup optical system 26 is provided with a chromatic aberration-correcting function, the illumination device 2A is very advantageous also in terms of cost.

The invention is not necessarily limited to the embodiments, but various modifications can be added thereto within the range not departing from the gist of the invention.

For example, an example in which the chromatic aberration-correcting optical element 45 is composed of one plano-concave lens has been described in the first embodiment, but the invention is not limited to this example. For example, as the chromatic aberration-correcting optical element 45, for example, a diffractive optical element composed of a computer generated hologram may be used.

Moreover, an example in which the polarization separation element 50A reflects the excitation light $BL_S$ toward the fluorescent light-emitting element 27 and reflects the blue light $BL'_P$ toward the diffuse reflection element 30 has been described in the embodiment, but the invention is not limited to this example. For example, the polarization separation element 50A may transmit the excitation light $BL_S$ therethrough toward the fluorescent light-emitting element 27 and reflect the blue light $BL'_P$ toward the diffuse reflection element 30.

Moreover, the case where the second semiconductor laser 212 that emits laser light at a peak wavelength of 440 nm is used for a laser light source for excitation light and the first semiconductor laser 211 that emits laser light at a peak wavelength of 460 nm is used for a laser light source for blue light has been illustrated in the embodiment, but the peak wavelengths of the excitation light BL and the blue light BL' are not necessarily limited to these examples.

Moreover, the projector 1 including the three light modulators 4R, 4G, and 4B has been illustrated in the embodiment, but the invention can be applied also to a projector that displays a color video (image) with one light modulator.

In addition, the shape, number, arrangement, material, and the like of various components of the illumination device and the projector are not limited to those of the embodiments, and can be appropriately changed.

Moreover, an example of mounting the illumination device according to the invention on the projector has been shown in the embodiment, but the invention is not limited to this example. The illumination device according to the invention can be applied also to a luminaire, a headlight of an automobile, or the like.

The entire disclosure of Japanese Patent Application No. 2014-141479, filed on Jul. 9, 2014 is expressly incorporated by reference herein.

What is claimed is:

1. An illumination device comprising:
a light source that emits first light at a first wavelength;
an integrator optical system on which the first light emitted from the light source is incident;
a wavelength conversion element that converts the first light transmitting through the integrator optical system into second light at a second wavelength different from the first wavelength;
a wavelength separation element that is provided on an optical path of the first light between the integrator optical system and the wavelength conversion element;
a pickup optical system that is provided between the wavelength conversion element and the wavelength separation element and receives the first light and the second light; and
a chromatic aberration-correcting optical element that is provided in at least one positron, the at least one position including: (i) a position between the integrator optical system and the wavelength separation element on the optical path of the first light; and (ii) a position downstream of the wavelength separation element on an optical path of the second light.

2. The illumination device according to claim 1, wherein the chromatic aberration-correcting optical element has negative power and is provided between the integrator optical system and the wavelength separation element on the optical path of the first light.

3. The illumination device according to claim 1, wherein the chromatic aberration-correcting optical element has positive power and is provided downstream of the wavelength separation element on the optical path of the second light.

4. A projector comprising:
an illumination device that emits illumination light;
a light modulator that modulates the illumination light in response to image information to thereby form image light; and
a projection optical system that projects the image light, wherein
the illumination device is the illumination device according to claim 1.

5. A projector comprising:
an illumination device that emits illumination light;
a light modulator that modulates the illumination light in response to image information to thereby form image light; and
a projection optical system that projects the image light, wherein
the illumination device is the illumination device according to claim 2.

6. A projector comprising:
an illumination device that emits illumination light;
a light modulator that modulates the illumination light in response to image information to thereby form image light; and
a projection optical system that projects the image light, wherein
the illumination device is the illumination device according to claim 3.

* * * * *